US006922942B2

(12) United States Patent
Stefanutti

(10) Patent No.: US 6,922,942 B2
(45) Date of Patent: Aug. 2, 2005

(54) VINE WIRE SUPPORT POST

(75) Inventor: Ricardo Michele Stefanutti, Kilsyth South (AU)

(73) Assignee: Vineyard Infrastracture & New Engineering Technologies Pty, Ltd., Brighton Victoria (AU)

(*) Notice: Subject to any disclaimer, the term of this patent is extended or adjusted under 35 U.S.C. 154(b) by 12 days.

(21) Appl. No.: 10/344,604

(22) PCT Filed: Aug. 9, 2001

(86) PCT No.: PCT/AU01/00978

§ 371 (c)(1), (2), (4) Date: Feb. 13, 2003

(87) PCT Pub. No.: WO02/15672

PCT Pub. Date: Feb. 28, 2002

(65) Prior Publication Data

US 2004/0025426 A1 Feb. 12, 2004

(30) Foreign Application Priority Data

Aug. 22, 2000 (AU) ............................................ PQ9556

(51) Int. Cl.[7] .......................... A01G 17/14; A01G 9/12

(52) U.S. Cl. .............................. 47/47; 47/46; 248/530; 256/19

(58) Field of Search ................................ 47/47, 44, 45, 47/46; 248/156, 530; 256/19

(56) References Cited

U.S. PATENT DOCUMENTS 229,385 A * 6/1880 Cunningham ................ 16/235
4,290,712 A * 9/1981 Hayes ......................... 404/10
4,523,405 A * 6/1985 Madonia ........................ 47/47
6,131,885 A * 10/2000 Berg et al. .................... 256/19
2004/0025426 A1 * 2/2004 Stefanutti ...................... 47/47

FOREIGN PATENT DOCUMENTS

| | | | |
|---|---|---|---|
| AU | 6379198 | 3/1998 | |
| AU | 9407498 | 2/1999 | |
| DE | 2961880 | 2/1997 | |
| FR | 2233928 | 1/1975 | |
| FR | 2273143 | 12/1975 | |
| FR | 2320029 | 2/1977 | |
| GB | 2032486 | 5/1980 | |
| GB | 2340371 A * | 2/2000 | .......... A01G/17/04 |
| RU | 1130258 | 12/1984 | |

* cited by examiner

*Primary Examiner*—Jeffrey L. Gellner
(74) *Attorney, Agent, or Firm*—Volpe and Koenig, P.C.

(57) ABSTRACT

A vine wire support post molded as integral unit from plastics has an elongate tapered supporting portion having upper end and lower end, a wire attachment provided on the supporting portion, a peg for holding support post in ground joined to lower end of supporting portion, a foot at the join between peg and supporting portion. The supporting portion is flexible and has variable sectional strength decreasing over a length of supporting portion from a position of higher sectional strength nearer lower end to a position of lower sectional strength nearer upper end.

5 Claims, 5 Drawing Sheets

A
B
C
D
E
1
3
5
7
9
11
12
13
14
15
17
18
19

SECTIONAL AREA IN mm squared
DISTANCE IN mm ALONG POST
1800
1700
1600
1500
1400
1300
1200
1100
1000
900
800
700
600
500
400
200
300
400
500
600
700
800
900
1000
1100
1200
1300
1400
1500
1600
1700
1800
1900
2000
2100
2200
2300

VINE WIRE SUPPORT POST

FIELD OF THE INVENTION

This invention relates to a post used for supporting wire in the upholding of vine within the vine industries.

BACKGROUND OF THE INVENTION

Traditional vine wire support posts are generally made of either metal or wood.

They are used to support the wire on which vines are supported during the fruit growing season. The post is used to prop up the wire and vine at 4.5 m to 6.0 m spacing between two end supports which are generally spaced between 100 m to 300 m apart. The posts generally have six wires to support, one for the irrigation tube, one for the main vine and four to support and train the foliage. The foliage wires are lowered and raised every year between pruning and harvesting. The loads applied to these posts are a nominally 20 kg/m vertical downward dead load and effectively 30% to 50% frontal area for wind loading. In many cases the top of the post is used to support netting to protect the fruit from damage due to birds and other fruit eating vermin.

In the case of the wooden posts, additional hardware in the form of support attachments are used to support the wire. The support clips are used to support the foliage wires and the staples are used to support the irrigation tube wire and the main vine wire. The support clips are fragile and subject to failure requiring replacement on a regular basis. The staples are prone to being driven in too far during initial installation. This causes excessive point loading of the wire and subsequent failure. The posthole must be bored into the ground and then the post is hammered into the hole. The installation process is time consuming and labour intensive. During harvesting the harvester uses a vigorous "to and fro" action to shake any fruit from the vines. The wooden post is rigid. It does not move "to and fro" with the vine and wire. Due to this a fair percentage of fruit is not collected, and left on the vine to rot. From time to time the movement of machinery throughout the vines will result in collision with the post. When this occurs the post is usually broken at ground level, thus requiring replacement.

In the case of the metal posts, the nature of the pressed metal form and its sharp edges cause the wire galvanising to be scratched off. This initiates rust in the wire and creates premature failure of the tension wires. Typically the post must be hammered into the ground for installation. However the post may be subject to sinking into the ground due to the "to and fro" motion of the harvest process and the natural frequency of the vines when subject to wind loadings. Furthermore during installation they tend to twist thus causing misalignment. From time to time, the movement of machinery throughout the vines will result in collision with the post and the post is usually permanently bent at ground level thus requiring replacement. The metal posts do not lend themselves to netting as the metal is too sharp and penetrates the netting.

It is an object of the invention to provide a vine wire support post which obviates or reduces one or more or the aforesaid difficulties or disadvantages.

DISCLOSURE OF THE INVENTION

The invention provides in one aspect a vine wire support post comprising,

- an elongate moulded plastics supporting portion having an upper end and a lower end,
- wire attachment means provided on the supporting portion, and
- a peg for holding the support post in the ground joined to the lower end of the supporting portion wherein the supporting portion is flexible and has variable sectional strength decreasing over a length of the supporting portion from a position of higher sectional strength nearer the lower end to a position of lower sectional strength nearer the upper end.

In order to vary the sectional strength over the length of at least part of the support post, the cross sectional area of the supporting portion may be decreased going from the lower end to the upper end. The cross sectional area may be decreased in various ways. For example the post may be tapered. Alternatively the material making up the construction of the post may be reduced in thickness. It may be varied by a combination of both of these. By having varying strength with height, the post can be made to bend readily when automatic harvesting machinery shakes the wires. This means that grapes hanging from wires immediately adjacent the post will move a greater distance than they would otherwise move if the post is more rigid. In turn this means that grapes are far less likely to be left on the vine around the region of the post after shaking by harvesting machines.

Apart from improving harvesting the flexibility of the post can also assist with automatic pruning. When rigid posts are used automatic pruning machines tend to leave the cane of vines uncut in the region next to the post downstream of the direction of travel of the pruning machine. However, applicants have found with the flexible post of the invention, there appears to be less likelihood of the cane being missed by the pruning machine because the post bends in such a manner that the pruning machine has better access to cane next to the downstream side of the post.

A still further advantage of posts of this type is that the progressive reduction in strength with height can mean that less plastics material need be used in the manufacture of the post. This clearly helps to reduce the overall manufacturing cost because of the use of less plastics material. The reduced weight also has handling and occupational health and safety advantages.

The post suitably includes a foot. The foot may extend laterally about a region where the peg and supporting portion are joined. It may be in the form of an integral web which surrounds the join of the peg and supporting portions.

The foot may be reinforced by other elements. For example, where the support post comprises an integral unit formed of the supporting portion, peg and foot, struts in the form of one or more integral webs extending from the peg to the underneath of the foot may be provided.

In order to maximise strength of the support post in the direction of the wires for holding vines attached to the post and in a direction which is perpendicular to this direction, it is preferred that the supporting portion have a generally cruciform cross section for at least a part of its length. Similarly, the peg may also have a generally cruciform cross section. Thus the arms defining the cruciform cross section may in themselves be formed as elongate ribs extending part or all of the way along the length of the peg and/or supporting portion of the support post. The cruciform arms may or may not be of equal length depending on the bending requirements appropriate for a particular post eg, in some situations the ribs running perpendicular to the wires may be weakened because they include slots for holding the wires. In such an instance these ribs may be longer to compensate for the weakening. Generally speaking it is preferred that the sectional strength of the supporting portion in any direction perpendicular to the length of the holding portion varies so that it increases by at least 50% over its length extending from a position nearer its upper end to a position nearer its lower end. The sectional area may also increase by at least 50%. In the case of the pegs the ribs may be designed to give greater strength in the lateral direction.

The wire attachment means may be in the form of slots provided in the ribs. The slots may be integrally moulded as part of the moulding process for forming the support post. The slots may have different forms depending upon their position on the post. For example, where the slots are located on support wires used to hold the branches of a vine growing upwardly from the vine the slots may have a generally T-shaped configuration. The head of the T may extend generally in the direction of the ribs whereas the tail of the T may provide access to the head of the T through the edge of the ribs. The advantage of this type of slot is that it allows the post to be used on undulating terrain. In undulating terrain, the wires supporting the branches of the vine may actually pull upwardly in certain situations (eg. when the post is at the bottom of a depressed area of land) with the wires being pulled up to the upward edge of the head portion of the T. Conversely, where the post is located on a raised section of land, the wires would tend to pull downwardly to the lower portion of the head of the T.

In another slot configuration the slot may have a generally C or spiral shape which serves to lock a wire held in the slot in a fixed position. Slots of this type are generally more suitable for the lower parts of the post such as for the wire which carries irrigation tubing.

The supporting portion of the post suitably has a length between 1500 mm and 2100 mm. The peg suitably has a length between 500 mm and 700 mm.

In order to support netting for protecting grapes from birds, the upper end of the supporting portion may be provided with an integrally formed head. Typically, the head may be round and will have a large enough diameter for the head to completely cover the upper end of the supporting portion.

Preferred aspects of the invention will now be described with reference to the accompanying drawings.

BRIEF DESCRIPTION OF THE DRAWINGS

FIG. 1EE shows an enlarged view of the circled section EE from a different perspective;

DETAILED DESCRIPTION OF THE PREFERRED EMBODIMENTS

Figures 1, 1A, 1B, 1C, 1D, 1E:
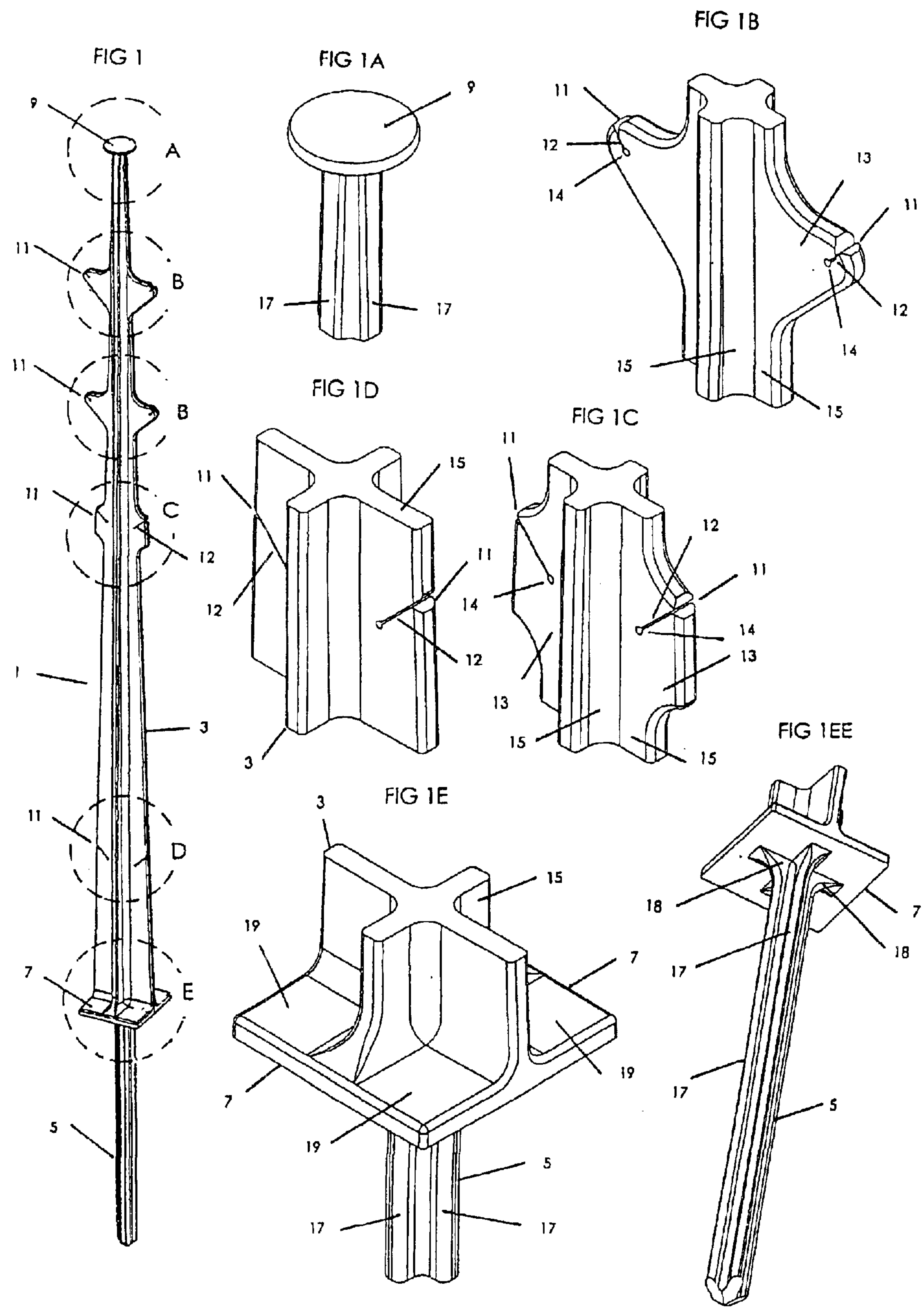
FIG. 1 shows a perspective view of a vine wire support post according to the invention.
FIG. 1A shows an enlarged view of the circled section A of FIG. 1.
FIG. 1B shows an enlarged view of the circled section B of FIG. 1.
FIG. 1C shows an enlarged view of the circled section C of FIG. 1.
FIG. 1D shows an enlarged view of the circled section D of FIG. 1.
FIG. 1E shows an enlarged view of the circled section E of FIG. 1.

Referring to FIGS. 1 and 1A to 1E, there is shown a vine wire support post 1 which includes a supporting portion 3 and a peg 5 attached to the bottom end of the supporting portion.

A foot 7 extends around the support post in the region where the supporting portion and peg are joined.

A circular head 9 is provided on the top of the supporting portion, the head being of sufficiently wide diameter to allow the head to completely cover the top of the supporting portion. Wire attachment means 11 are provided at various positions along the supporting portion.

As the post is designed in such a way that it can be moulded from a plastics material all the above described elements of the post may be integrally formed as one unit in the moulding process.

Whilst it is to be appreciated that the post can be readily manufactured from a range of plastics materials, applicants have found that polyethylene and polypropylene are particularly suitable materials for this purpose. The plastic material may also incorporate reinforcements such as glass fibre, kevlar or glass microspheres depending upon the strength and properties required in particular situations. The plastics may also include standard additives such as UV stabilisers and other materials normally used in processing plastics for moulding.

The wire attachment means 11 of the post may be formed as slots 12. These slots may be formed in ears 13 integrally formed with the plastics material of the post. The slots may include an expanded opening 14 to assist with retaining wires in the slots.

Both the supporting portion and peg may have a cruciform cross section. Thus they may comprise four ribs 15 in the case of the supporting portion at right angles to each other. In the case of the peg, four ribs 17 are provided.

Depending upon the bending characteristics required of the post, the length of the ribs extending in the direction in which the wires are strung may be different to those at right angles to this direction. In the illustrated embodiment, the ribs including the slots 12 are longer than the other pair of ribs to compensate for the reduction in strength arising from the provision of the slots.

As can be seen more clearly in FIG. 1EE, the ribs 17 may broaden out underneath the foot 7 to form four webs 18 which provide support and reinforcement for the four web sections 19 making up the foot.

Figure 2:
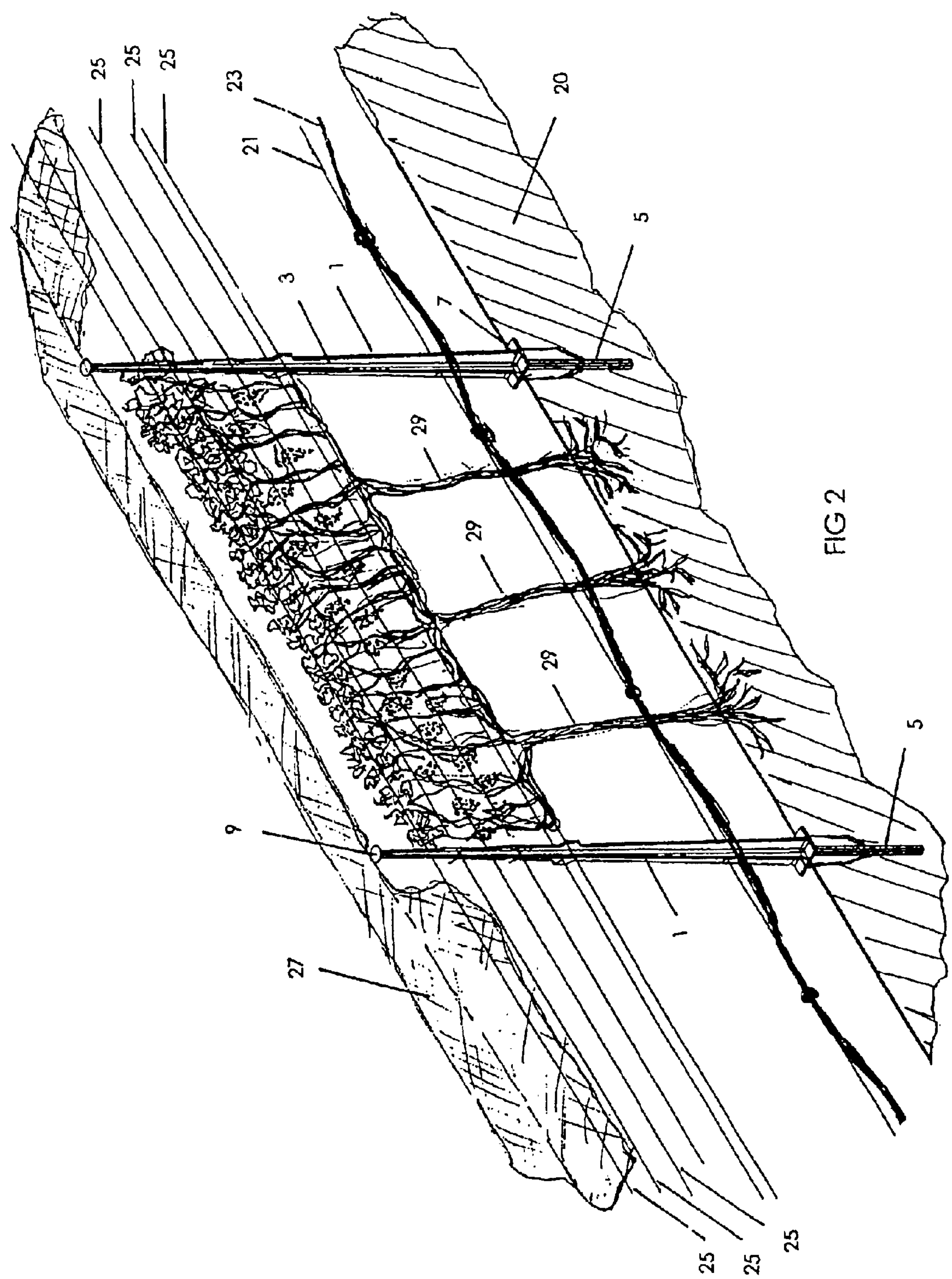
FIG. 2 shows the vine wire support post of FIG. 1 in use in a vineyard.
Figure 4:
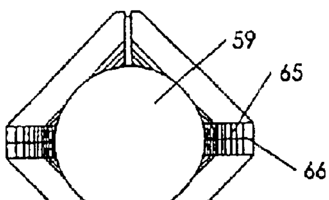
FIG. 4 shows a top down plan view of FIG. 3.

Referring to FIG. 2, the posts according to FIG. 1 may be installed by pre-drilling or punching a hole in the soil 20. The hole may be of slightly lesser diameter than the diameter of the peg. The post may be pressed into the ground so that the entire length of the peg which is about 600 mm is held snugly in the hole. The foot 7 is provided to prevent the post from sinking any further than the surface level of the soil.

The supporting portion 3 which may be about 1800 mm in length includes a lower most wire 21 held in the slots of wire attachment means formed on each post. The lower most wire is used to hold the irrigation tube 23 as is known in the art.

A number of additional wires 25 are held in the slots at the upper parts of the post and these are used to support the vines 29.

Netting 27 applied over the tops of the posts so that it rests on the heads 9, is used to protect the vines from birds.

Referring to FIGS. 3, 3A to 3D, and 4 to 6 of the drawings there is shown a vine wire support post 51 according to the invention having similar characteristics to that described with reference to FIG. 1. In particular, the tapering of the supporting portion 53 is similar to the tapering of the corresponding supporting portion 3 shown in FIG. 1. This means that the sectional strength of the post varies with height such that the lower most part of the supporting portion is stronger than the higher part.

The post includes a peg 55, foot 57 and head 59 which all perform substantially the same functions as equivalent integers described with reference to FIG. 1.

The wire attachment means 61 are slightly different to those described with reference to FIG. 1 in that they take two forms. In the upper parts of the supporting portion, the wire attachment means may comprise a T-shaped slot 62. The T-shaped slot is arranged so that the head of the T extends generally vertically in the lengthwise direction of the ribs 65 on which they are formed. The tail of the T ends in an opening which allows access for wires to be slipped through the tail into the head of the T section.

In order to give more strength to the slot which must hold wires carrying the weight of the vines, the ribs 65 which include the wire attachment means have a perpendicular web 66 extending along the length of the rib at its outer edge. Thus the T-shaped slot has a greater width than the width of body of the rib 65 extending from the centre of the post.

The T-shaped nature of the slot allows the wire to pull upwardly or push downwardly in the slot without becoming dislodged.

A number of web elements 64 which are integrally formed in the plastics moulding process, extend between adjacent ribs to lend torsional rigidity to the supporting portion.

The wire attachment means formed in the lower parts of the supporting portion are in the form of a curved slot 63 which may have a generally C or spiral shaped configuration. The different configuration for the slot in lower most portion is preferred because it is anticipated that wires threaded through the lower curved slots 63 will be fixed permanently in place. The particular shape of curved slot is more readily adapted to hold wires permanently than the T slots. By comparison, the shape of the T-slots 62 allows the wires to be readily removed and placed into slots at different levels as the branches of the vine grow and the vine is trained to grow up to the full height of the post.

As for the peg 55, it can be seen that this also includes four ribs 67 which are themselves reinforced by a number of webs 71 extending between adjacent ribs. The peg narrows in diameter towards its pointed end 75. It is provided with barbs 73 on its ribs near the pointed end to aid retention of the peg in the soil. The peg ribs are designed so that they give more support in the lateral direction ie. in the direction of the wire. Thus the lateral ribs 67 remain broad for a distance before narrowing. The other two ribs narrow more rapidly, as the requirement for strength in the longitudinal direction is not as great.

The foot 57 includes four foot web portions 69 extending between adjacent ribs of the supporting portion and peg. Integrally formed support webs 68 extend from the sides of the ribs 67 of the peg to lend further support to the foot web portions 69.

Figure 3:
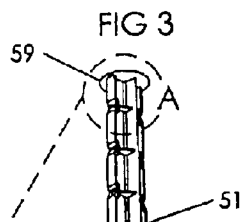
FIG. 3 shows a perspective view of an alternative vine wire post construction according to the invention.
Figure 6:
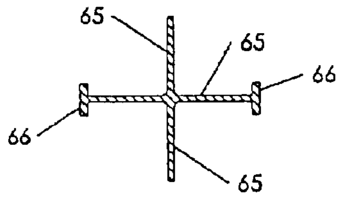
FIG. 6 shows the section X—X of FIG. 3.
Figure 3A:
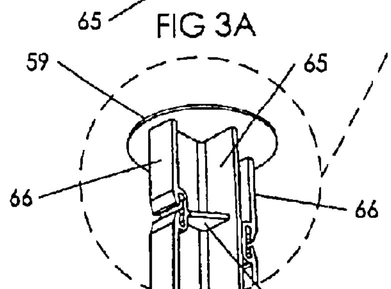
FIG. 3A shows an enlarged view of the circled section A of FIG. 3.
Figure 3B:
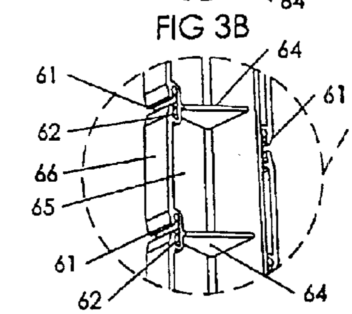
FIG. 3B shows an enlarged view of the circled section B of FIG. 3.
Figure 3C:
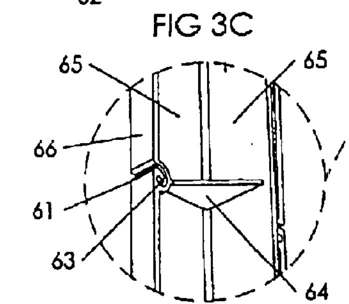
FIG. 3C shows an enlarged view of the circled section C of FIG. 3.
Figure 5:
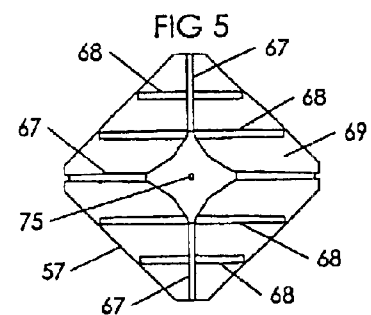
FIG. 5 shows a bottom up plan view of FIG. 3.
Figure 3D:
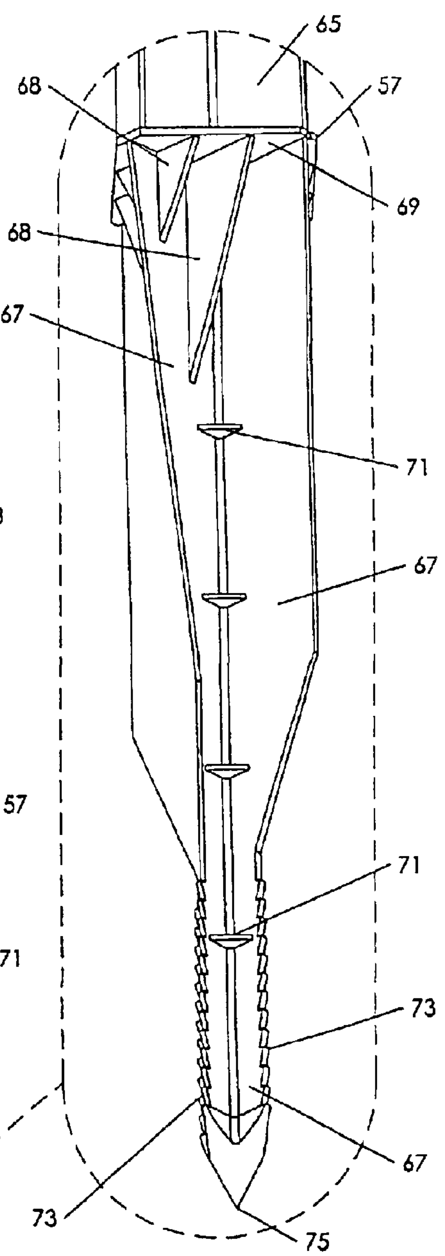
FIG. 3D shows an enlarged view of the circled section D of FIG. 3.
Figure 7:
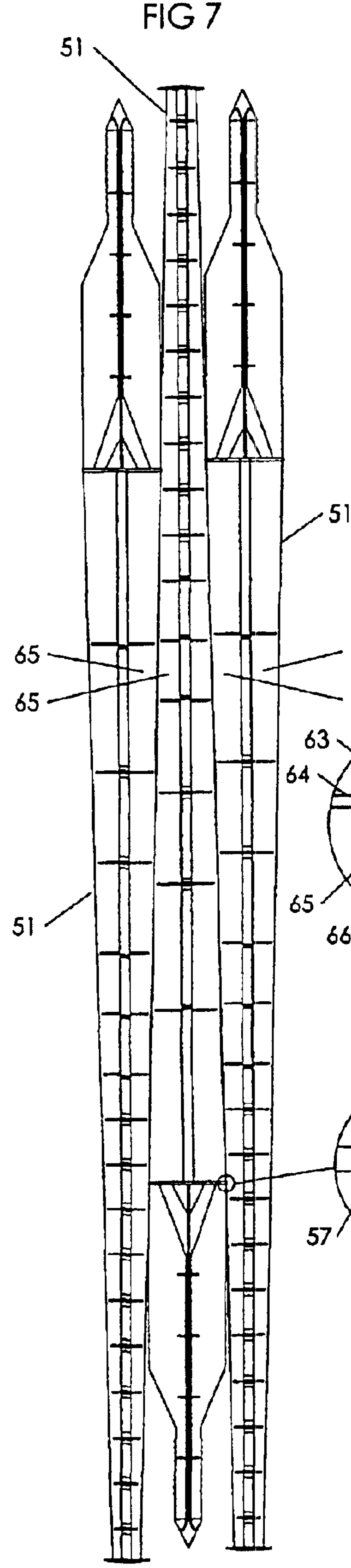
FIG. 7 shows a plan view of three posts according to FIG. 3 stacked side by side.
Figure 8A:
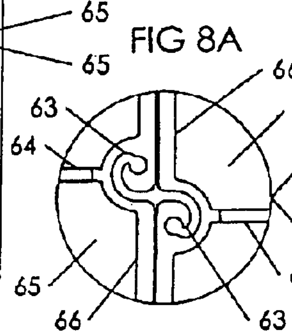
FIG. 8A shows an enlarged view of the circled section A of FIG. 3.
Figure 7A:
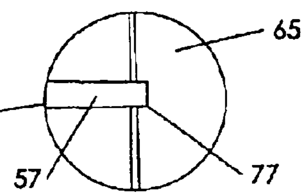
FIG. 7A shows an enlarged view of the circled section A of FIG. 3.
Figure 8:
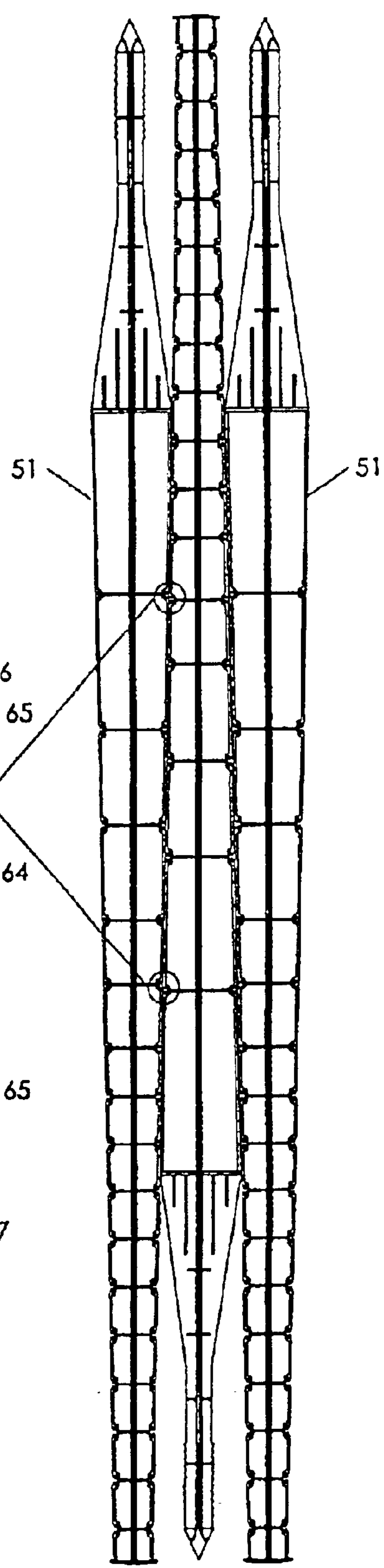
FIG. 8 shows a plan view of the three posts according to FIG. 3 stacked on top of each other.

Referring to FIGS. 7 and 8, it can be seen that a number of posts as shown in FIG. 3 may be stacked head to tail. Thus, when looking at the expanded view in FIG. 7A it can be seen that the rib 65 includes a slot 77 shaped so that it can receive the edge of the foot 57 to locate adjacent posts with respect to each other.

Similarly, when looking FIG. 8A, it can be seen that the curved slots 63 meet to form an S-shaped slot when posts are stacked one atop the other. Thus the posts may be locked together by sliding an S-shaped member into the S-shaped slot formed by abutting slots 63.

Accordingly vine wire supports constructed along the lines of those described with reference to FIG. 3 can be stacked in three dimensional arrays in a manner which locks them together. This is a substantial aid for packaging of batches of support posts for transport and sale.

Figure 9:
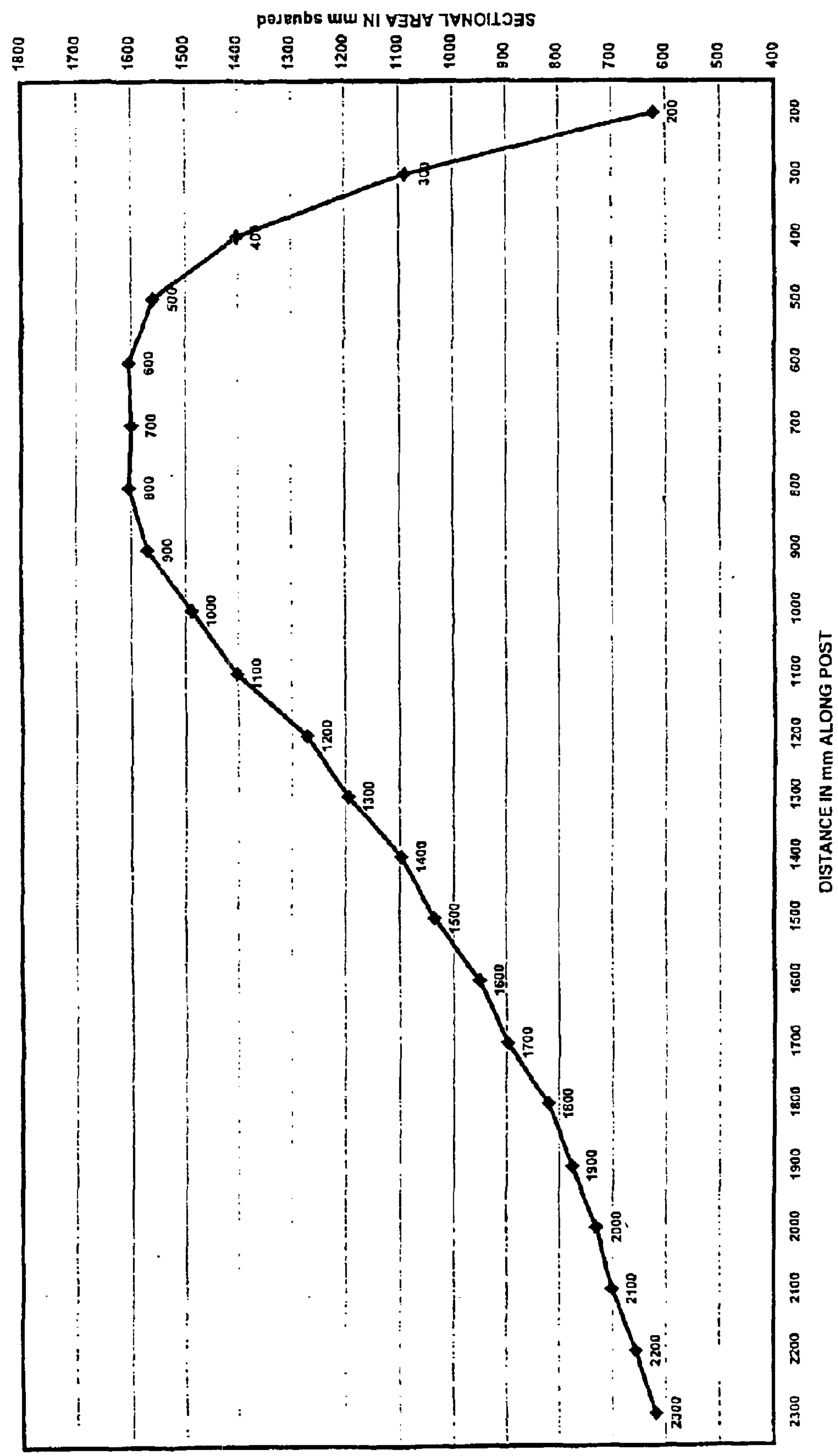
FIG. 9 shows a graph of sectional area versus distance along the post.

Referring to FIG. 9, it can be seen that the sectional area of the post versus its length varies with its height. In turn the strength will vary in similar fashion. Thus from the graph it can be seen that the strength of the peg portion is lowest near its pointed end and increases to the region of the foot which is 600 mm above the pointed end. From the 600 mm to 2300 mm position along the length of the supporting portion, the sectional area decreases quite dramatically. Hence the strength will decrease in corresponding fashion.

It is to be understood that the word comprising as used throughout the specification is to be interpreted in its inclusive form ie. use of the word comprising does not exclude the addition of other elements.

It is to be understood that various modifications of and/or additions to the invention can be made without departing from the basic nature of the invention. These modifications and/or additions are therefore considered to fall within the scope of the invention.

What is claimed is:

1. A vine wire support post molded as an integral unit from plastics material comprising, an elongate supporting portion having two pairs of opposed joined support ribs giving the elongate supporting portion a generally cruciform cross sectional shape, the elongate supporting portion having an upper end and a lower end, a generally T-shaped reinforcing edge extending lengthwise along an outer edge of each rib of one of the pairs of support ribs, wire attachment means provided on the supporting portion, a peg for holding the support post in the ground, joined to the lower end of the supporting portion, the peg comprising four joined downwardly extending peg ribs which give the peg a generally cruciform cross sectional shape, a generally planar foot extending laterally about the region where the peg and supporting portion are joined, and at least one integral generally planar web for each peg rib extending vertically downwardly from the generally planar foot to join with and reinforce a respective peg rib, wherein the supporting portion is flexible and has variable sectional strength decreasing from a position of higher sectional strength gradually at the lower end to a position of lower sectional strength near the upper end.

2. A vine wire support post according to claim 1 wherein the supporting portion has a cross sectional area which decreases over its length from its lower end to its upper end, the sectional strength of the supporting portion increases by at least 50% over a length of the supporting portion between the upper end and the lower end, and the attachment means comprise one or more slots formed in at least one of the support ribs.

3. A vine wire support post according to claim 2 wherein the attachment means comprise one or more T-shaped slots formed in the reinforcing edge of one of the respective support ribs.

4. A vine wire support post according to claim 1 wherein a plurality of reinforcing web elements extend between all adjacent pairs of support ribs.

5. A vine wire support post according to claim 1 including complementary locating means adapted to hold and locate a plurality of similarly constructed support post.

* * * * *